US008341262B2

(12) United States Patent  (10) Patent No.: US 8,341,262 B2
Pirzada et al.  (45) Date of Patent: Dec. 25, 2012

(54) SYSTEM AND METHOD FOR MANAGING THE OFFLOAD TYPE FOR OFFLOAD PROTOCOL PROCESSING

(75) Inventors: Fahd B. Pirzada, Austin, TX (US); Robert L. Winter, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 498 days.

(21) Appl. No.: 12/267,131

(22) Filed: Nov. 7, 2008

(65) Prior Publication Data
US 2010/0121947 A1 May 13, 2010

(51) Int. Cl.
*G06F 15/173* (2006.01)
(52) U.S. Cl. ...................................................... 709/224
(58) Field of Classification Search .................. 709/238, 709/218, 249, 232, 224, 226; 370/249, 352, 370/401, 466, 384, 385, 389; 379/114, 126; 714/715, 716, 714
See application file for complete search history.

(56) References Cited

U.S. PATENT DOCUMENTS

| | | | |
|---|---|---|---|
| 7,346,924 B2 * | 3/2008 | Miyawaki et al. | 726/6 |
| 7,457,881 B2 * | 11/2008 | Mohamed et al. | 709/230 |
| 2003/0091020 A1 * | 5/2003 | Bantukul et al. | 370/349 |
| 2003/0158906 A1 * | 8/2003 | Hayes | 709/211 |
| 2004/0042483 A1 * | 3/2004 | Elzur et al. | 370/463 |
| 2005/0066060 A1 * | 3/2005 | Pinkerton et al. | 709/249 |
| 2005/0083960 A1 * | 4/2005 | Gutierrez et al. | 370/428 |

* cited by examiner

*Primary Examiner* — Joseph Avellino
*Assistant Examiner* — Mark O Afolabi
(74) *Attorney, Agent, or Firm* — Baker Botts L.L.P.

(57) ABSTRACT

A method for determining the offload type for the processing of the protocol of a network connection is disclosed. An offload policy manager in a server node determines the offload type on the basis of a number of factors, including the application type of the network connection, the traffic priority of the network connection, and the port of the network connection. After the offload policy manager selects the offload type of the network connection, the offload policy manager identifies the offload type to the offload engine, which processes the protocol of the network connection according to the offload type selected by the offload policy manager. The offload policy manager is able to access a number of application-specific tables. The offload policy manager selects an offload type by cross-referencing on an application-specific table the traffic priority of the network connection against the port of the network connection.

17 Claims, 3 Drawing Sheets

DATABASE APPLICATION TABLE
TRAFFIC PRIORITY

| PORT | HIGH | ELEV. | MED. | LOW | N/A |
|---|---|---|---|---|---|
| 80 | LS | LS | LS | CS | CS |
| 20 | LS | LS | CS | LR | CS |
| 53 | LS | CS | LR | LR | CS |
| 115 | CS | LR | LR | LR | CS |

CS=CHECKSUM OFFLOAD
LS=LARGE SEGMENT OFFLOAD
LR=LARGE RECEIVE OFFLOAD

SYSTEM AND METHOD FOR MANAGING THE OFFLOAD TYPE FOR OFFLOAD PROTOCOL PROCESSING

TECHNICAL FIELD

The present disclosure relates generally to computer systems and information handling systems, and, more particularly, to a system and method the offload type for offload protocol processing.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

An information handling system, including computer systems, may communicate with one another according to the TCP/IP (Transmission Control Protocol/Internet Protocol) communication standard or another suitable communications standard. The increasingly larger bandwidth that is available on communications networks has created processing bottlenecks at the nodes of the network related to the processing of the communications protocol at the nodes of the network. Although a communication network may be able to transport data according to the available bandwidth of the communications network, the processors at each node of the network are not able to perform the protocol processing of the data of the communications stream as quickly as the data is transmitted or delivered at each network node. One option for managing the inability of a network node to quickly process the data of the communications stream is to offload the protocol processing to an associated offload engine for processing.

Any of several distinct types of offload processing types may be employed. It is often the case that one type of offload processing is typically applied to the connection without regard to the application associated with the network connection, the port of the connection, or the traffic priority of the connection. Because the selection of the offload processing type is not tailored to the parameters of the connection, the selection of the offload processing type is rigidly applied and may not be suited to optimize the operation of the communications network or the operational goals of the administrator of the network.

SUMMARY

In accordance with the present disclosure, a method for determining the offload type for the processing of the protocol of a network connection is disclosed. An offload policy manager in a server node determines the offload type on the basis of a number of factors, including the application type of the network connection, the traffic priority of the network connection, and the port of the network connection. After the offload policy manager selects the offload type of the network connection, the offload policy manager identifies the offload type to the offload engine, which processes the protocol of the network connection according to the offload type selected by the offload policy manager. The offload policy manager is able to access a number of application-specific tables. The offload policy manager selects an offload type by cross-referencing on an application-specific table the traffic priority of the network connection against the port of the network connection.

The offload policy manager disclosed herein is technically advantageous because it provides a method for tailoring the offload type to the characteristics of the network connection. Because the offload type is matched to the characteristics of the network connection, the offload engine may process the communications protocol more efficiently. The system and method disclosed herein is also technically advantageous because the administrator of the network or server node can tailor the operation of the offload engine according to the needs or parameters of the network connection. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
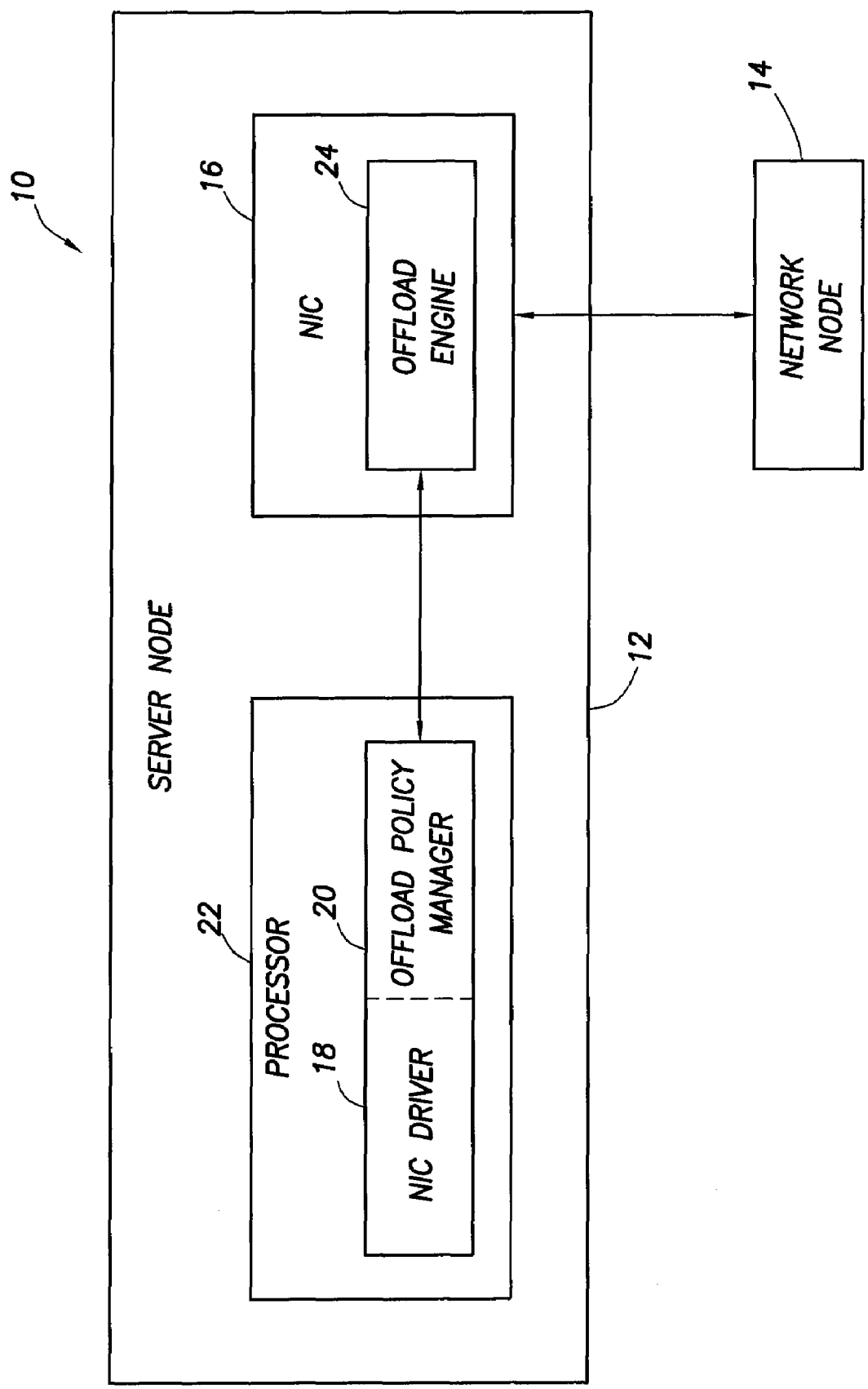
FIG. 1 is a diagram of a network.

Shown in FIG. 1 is a diagram of a network, which is indicated generally at 10. Network 10 includes a server node 12 that is coupled to a network node or client node 14. A selection of the hardware and software elements of server node 12 is shown in FIG. 1. Server node 12 includes a network interface card (NIC) 16. Network interface card 16 includes an offload engine 24. Offload engine 24 executes on the processor of network interface card 16 and performs the protocol processing task for the incoming communications stream from network node 14. Offload engine 24 of network interface card 16 communicates with a network interface card driver 18, which includes an offload policy manager 20. Network interface card driver 18 is able to support multiple offload simultaneously. In the embodiment of FIG. 1, the offload policy manager 20 is a portion of the network interface card driver 18. In other embodiments, offload policy manager 20 may reside on and execute on network interface card 16. In the embodiment in which the offload policy manager 20 resides in network interface card 16, offload policy manager 20 may comprise a portion of offload engine 24. In the embodiment of FIG. 1, network interface card driver 18, including offload policy manger 20, executes on a processor 22 of server node 12.

Figures 2, 3:
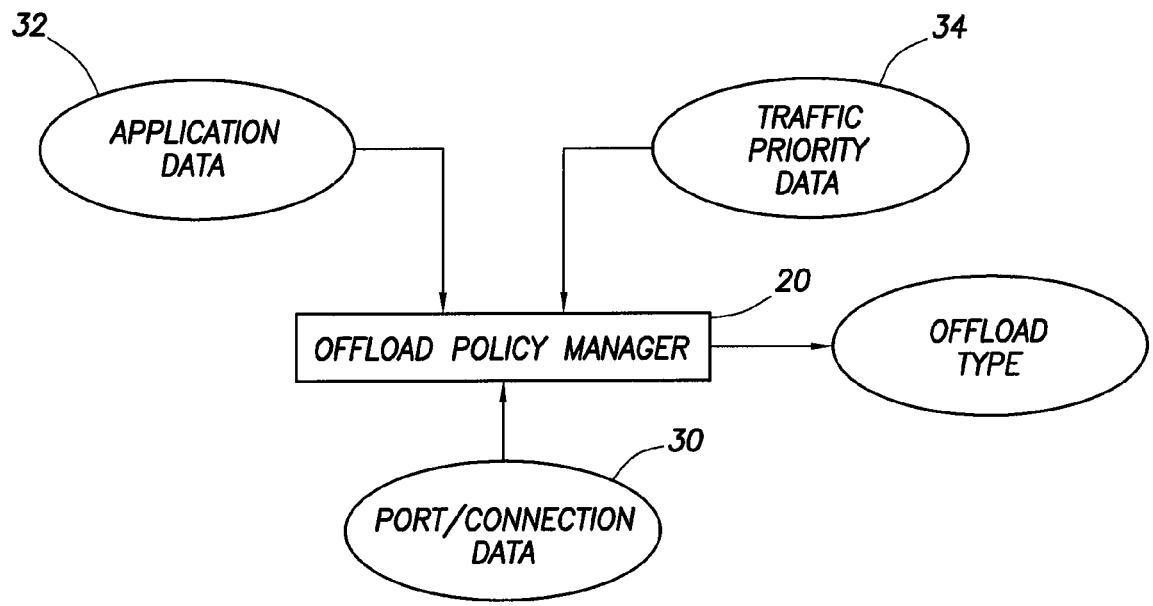
FIG. 2 is a diagram of the inputs and the output of the offload policy manager.
FIG. 3 is an example of an application-specific offload table.

Offload policy manager 20 is a software-based policy manager that receives input in the form of application data 32, traffic priority data 34, and port/connection data 30. A diagram of the data inputs and the output of offload policy manager 20 is shown in FIG. 2. Offload policy manager 20 is able to receive each of the application data 32, priority data 34, and port/connection data 30 from offload engine 24. Alternatively, offload policy manager could receive one more of the application data 32, priority data 34, and port/connection data 30 from an input provided by the user or administrator of the network. Application data 32 identifies the type of application that is associated with the transmitted data between the server node 12 and the network or client node 14. Examples of application types are a mail application, database application, or multimedia application. Traffic priority data identifies the traffic priority for a connection. A traffic priority of high may be assigned to the most critical connections, indicating that the traffic should have priority over all other connections at server node 12; a traffic priority of low may be assigned to lower priority connections, and a traffic priority of background (also designated as N/A) may be assigned to connections that may operate intermittently or in the background. Port/connection data 30 identifies the port of the network connection.

Offload policy manager 20 selects an offload type for the processing of the communications protocol. The offload type is tailored to (a) the application associated with the communication between the server node 10 and the network node 14; (b) the traffic priority of the connection; and (c) the port of the connection. The offload type is selected through an application-specific offload table. Each application is uniquely associated with an offload table. For example, a mail application will be associated with a unique offload table, and a database application will be associated with a unique offload table that is separate from the offload table associated with the mail application. An example of an application-specific offload table 30 is shown in FIG. 3. The application-specific offload table of FIG. 3 is uniquely associated with a database application and is accessible by offload policy manager 20.

In the table of FIG. 3, the traffic priority of the connection is cross-referenced against the port of the connection to establish the offload type for the connection. The available traffic priorities, which range from high to low, are: High, Elevated (Elev.), Medium, Low, and Not Applicable (N/A). A traffic priority level of Not Applicable means that the traffic priority of the connection cannot be categorized or has a traffic priority of background. The ports identified on the left-hand side of the application-specific offload table are the most common ports for network connections, although it is contemplated that the application-specific offload tables of FIG. 3 will include an entry for every possible port. The application-specific offload tables are stored in storage associated with server node 12 or network interface card 16. The table also includes an entry that identifies the offload type for each port and traffic priority entry. In the example of FIG. 3, the offload types are checksum offload (CS), large segment offload (LS), and large receive offload (LR). These offload types are provided as examples, and the system and method disclosed herein is not limited to the specific offload types identified in FIG. 3; it is contemplated that other offload types may be employed.

Figure 4:
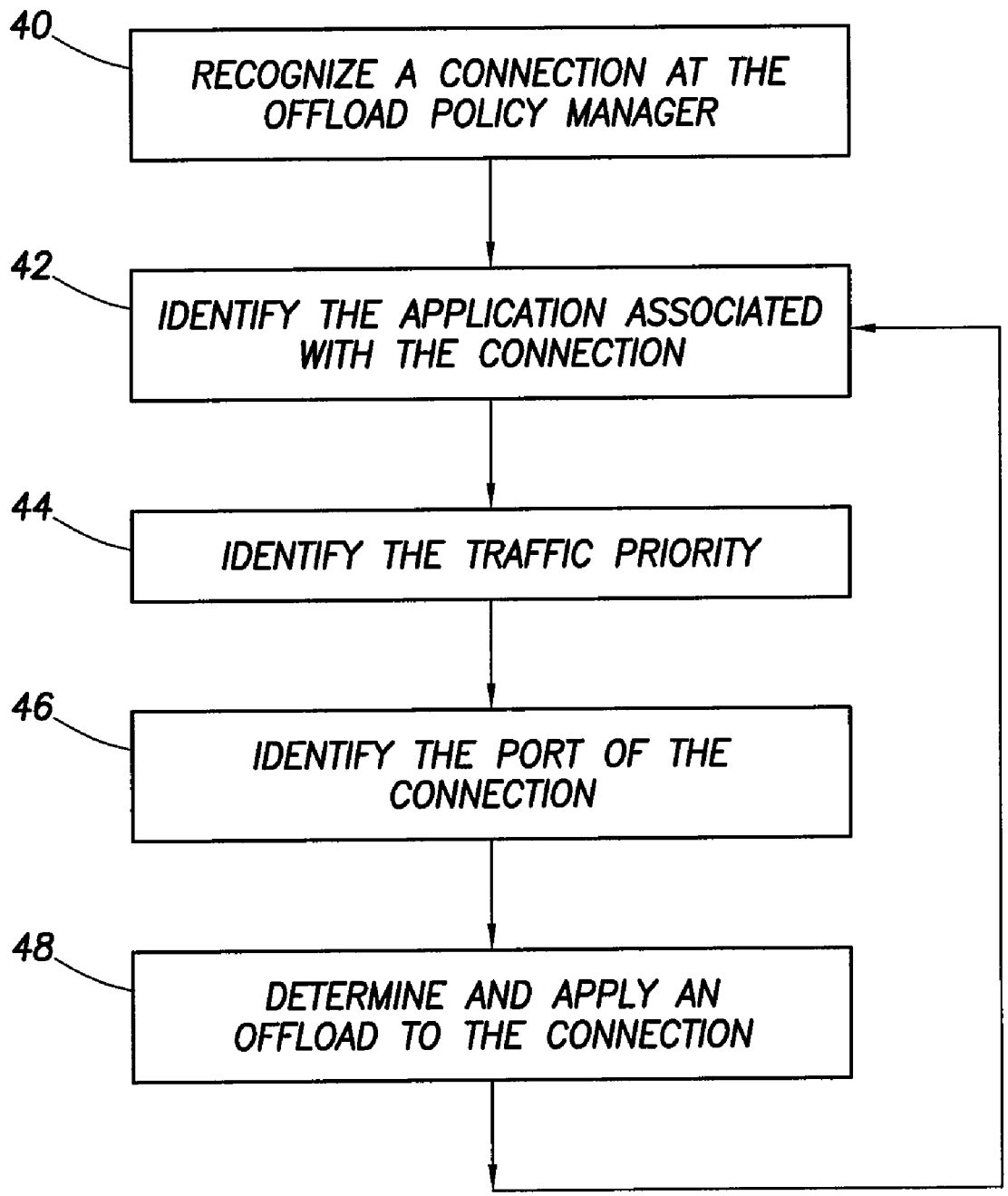
FIG. 4 is a flow diagram of a series of method steps for determining the offload type to be applied to the processing of a communications protocol.

Shown in FIG. 4 is a flow diagram of a series of method steps for determining the offload type to be applied to the processing of a communications protocol. At step 40, offload policy manager 20 recognizes a connection at network interface card 16. Network interface card 16 or offload engine 24 may also notify offload policy manager 20 of the connection. At step 42, the offload policy manager identifies or receives an identifier for the application associated with the connection. Examples of application types are a mail application or a database application. Following the determination of the application type that is associated with the connection, the offload policy manager at step 44 identifies or receives an identifier of the traffic priority of the connection. The identification of the traffic priority may be provided, for example, by header information included with the data in the connection or may be provided by a user or administrator of the network. At step 46, the offload policy manager identifies or receives an identifier for the port of the connection. The identification of the offload type for the connection is accomplished by identifying the table associated with the application associated with the connection and cross-referencing the data priority of the connection against the port of the connection. Following the collection of the offload parameters at steps 42, 44, and 46, the offload policy manager determines the appropriate offload type for the connection and identifies the offload type to the offload engine, which performs the offload processing according to the offload type identified by the offload policy manager. As one example, and with reference to FIG. 3, if the application associated with the connection is a database application, and if the port of the connection is 53 and the traffic priority is medium, the offload type is LR (large receive offload).

The offload policy manager disclosed herein is technically advantageous because it provides a method for tailoring the offload type to the characteristics of the network connection. Because the offload type is matched to the characteristics of the network connection, the offload engine may process the communications protocol more efficiently. The system and method disclosed herein is also technically advantageous because the administrator of the network or server node can tailor the operation of the offload engine according to the needs or parameters of the network connection. It should be recognized that the system and method disclosed herein is not limited in its application to any specific communications protocol. Rather, the system and method employed herein may be employed with any suitable communications protocol, including TCP/IP and UDP. Although the present disclosure has been described in detail, it should be understood that various changes, substitutions, and alterations can be made hereto without departing from the spirit and the scope of the invention as defined by the appended claims.

What is claimed is:

1. A method for determining the offload type for the processing of a protocol of a network connection, comprising:
identifying the protocol types and offload types supported by the hardware, firmware, and software of the network connection;
identifying the application associated with the network connection;
identifying the priority assigned by the application to the traffic flowing over the network connection;
identifying the port of the network connection;
determining the preferred offload type of the network connection based at least in part on an application-specific table, wherein the application-specific table includes the protocol types and offload types supported by the hardware, the application associated with the network connection, the priority assigned by the application, and the port of the network connection; and
wherein the step of determining the offload type of the network connection is accomplished by cross-referencing the port of the network connection against the traffic priority of the connection in the application-specific table.

2. The method for determining the offload type for the processing of a protocol of a network connection of claim 1, wherein the application-specific table is updated if a new applications is made available or if the network connection is changed to support more types of protocols or offload.

3. The method for determining the offload type for the processing of a protocol of a network connection of claim, wherein a set of application-specific tables are stored at a network interface card at the terminus of the network connection.

4. The method for determining the offload type for the processing of a protocol of a network connection of claim 1, further comprising the step of transmitting the offload type to an offload engine for processing the protocol of the network connection.

5. The method for determining the offload type for the processing of a protocol of a network connection of claim 4, wherein the offload engine is associated with a network interface card in a server node.

6. The method for determining the offload type for the processing of a protocol of a network connection of claim 5, wherein the step of determining the offload type of the network connection is performed at an offload policy manager associated with a driver for a network interface card.

7. The method for determining the offload type for the processing of a protocol of a network connection of claim 6, wherein the application-specific tables are stored in storage within the server node.

8. The method for determining the offload type for the processing of a protocol of a network connection of claim 6, wherein the application-specific tables are stored in storage within the network interface card.

9. A server node, comprising:
a processor;
a network interface card;
an offload policy manager wherein the offload policy manager executes on the processor;
a TCP offload engine communicatively coupled to the offload policy manager manager; wherein the TCP offload engine executes on the network card; and wherein the offload policy manager is operable to determine the offload type of a network connection at the server node based at least in part on an application-specific table, wherein the application-specific table includes the protocol types and offload types supported by the hardware; and
wherein the offload policy manager determines the offload type of the network connection by accessing an application-specific table and cross-referencing within the table the table the priority of the network connection against the port of the network connection.

10. The server node of claim 9, wherein the factors include the application type of the network connection.

11. The server node of claim 9, wherein the factors include the traffic priority of the network connection.

12. The server node of claim 9, wherein the factors include the port of the network connection.

13. The server node of claim 9, wherein the offload policy manager is associated with a network interface card driver.

14. The server node of claim 13, wherein the offload engine is associated with a network interface card.

15. A method for determining the offload type of a network connection at a server node, comprising:
identifying the application associated with the network connection;
identifying the traffic priority of the network connection;
identifying the port of the network connection; and
determining the offload type of the network connection based at least in part on an application-specific table, wherein the application-specific table includes the application associated with the network connection, the traffic priority of the network connection, and the port of the network connection;
wherein the steps of identifying and the step of determining are performed at all offload policy manager on the server node; and
wherein the step of determining the offload type of the network connection is accomplished by cross-referencing the port of the network connection against the traffic priority of the connection in the application-specific table.

16. The method for determining the offload type of a network connection at a server node of claim 15, wherein the step of determining the offload type of the network connection is accomplished by selecting an application-specific table.

17. A method for determining the offload type for the processing of a protocol of a network connection, comprising:
identifying the application associated with the network connection;
identifying the priority associated with traffic flowing over the network connection;
identifying the port of the network connection;
determining the offload the of the network connection based at least in part on an application-specific table, wherein the application-specific table includes the application associated with the network connection the priority associated with traffic flowing over the network connection, and the port of the network connection; and
wherein the step of determining the offload type of the network connection is accomplished by cross-referencing the port of the network connection against the traffic priority of the connection in the application-specific table.

* * * * *